United States Patent [19]

Shiio et al.

[11] 3,784,407
[45] Jan. 8, 1974

[54] BAKED RESISTANCE MEMBER AND THE PROCESS OF MANUFACTURE THEREOF

[75] Inventors: Hajime Shiio, Nishi; Masami Yamaguchi, Kozakai, both of Japan

[73] Assignee: Ceramic Kagaku Yugen Kaisha, Toukai-shi, Aichi-ken, Japan

[22] Filed: May 25, 1971

[21] Appl. No.: 146,788

[30] Foreign Application Priority Data
May 26, 1970 Japan.............................. 45/45059

[52] U.S. Cl.................. 117/227, 117/212, 252/512
[51] Int. Cl.......................... B44d 1/02, B44d 1/18
[58] Field of Search............... 117/227, 212, 160 R; 252/512

[56] References Cited
UNITED STATES PATENTS

| 3,647,532 | 3/1972 | Friedman........................... 117/212 |
| 3,539,392 | 11/1970 | Cockbain............................. 117/227 |
| 3,458,352 | 7/1969 | Dietsch................................ 117/227 |
| 3,109,754 | 11/1963 | Tielens................................ 117/227 |
| 2,803,729 | 8/1957 | Kohring............................... 117/227 |

Primary Examiner—Alfred L. Leavitt
Assistant Examiner—M. F. Esposito
Attorney—Waters, Roditi, Schwartz et al.

[57] ABSTRACT

A resistance member is produced by forming a paste of zinc metal powder and synthetic resin paint, applying the paste as a film on a base and heating the base to remove the paint component and leave a baked film of zinc on the base. The zinc film is substantially non-oxidized and has a determinate resistance value. Glass powder and other metal powders may be mixed with the zinc to control the final resistance value, but the zinc must be initially present in an amount of at least 20 percent by weight.

14 Claims, No Drawings

BAKED RESISTANCE MEMBER AND THE PROCESS OF MANUFACTURE THEREOF

SUMMARY OF THE INVENTION

This invention relates to a novel baked resistance member applicable as an electric resistance for a thick film integrated circuit or the like and it is characterized in that a baked resistance film containing at least 20 percent zinc is formed on a base. Additionally, the invention is directed to a method for manufacturing the foregoing baked resistance member and it is characterized in that zinc metal powder alone or in a mixture thereof with inorganic powder is blended with a synthetic resin paint to form a paste, and the paste is applied to a base to form a film thereon and then the film is heated so as to form a baked zinc film.

Herein, the term "inorganic powder" is intended to include non-metal powders such as glass powder which is softened or molten on baking, and metal powders such as copper, tin, lead or the like which become oxidized upon baking.

As the synthetic resin paint, there may be used a commercially available synthetic resin paint for silk screen printing, i.e., so-called "squeegee oil," and it may comprise a cellulose derivative resin such as ethylcellulose, cellulose acetate, cellulose butyrate, cellulose nitrate or the like, or a vinyl resin such as polyacrylic ester, polymethacrylic ester, polyvinyl alcohol, polybutyl resin, polystyrene or the like, or a mixture of the cellulose derivative resin and the vinyl resin, and a vehicle such as an ester, ketone, ether, or other conventional organic solvent. For instance, the paint may be constituted as 30 percent polymethacrylic ester in benzyl alcohol or 40 percent polymethacrylic ester in trimethyl benzene.

This type of synthetic resin paint has the property that it begins burning and generating combustion gas from a temperature near but below the melting point of metal zinc, that is, from about 350°C., and continues burning up to a temperature near but above the melting point, that is, to about 450°C. and therefore within the range of these temperatures it produces a large amount of combustion gas.

As the baking condition, a temperature between 650° - 750°C. for 10 - 15 minutes is optimum and under such condition the resin of the paint is burned away so completely that no substances, such as carbon, remain on the base.

The conventional baked film hitherto used for a thick film integrated circuit is prepared by a method in which a mixed metal powder comprising as a main ingredient silver and minor amounts of palladium or ruthenium oxide is blended with glass powder and a synthetic resin dissolved in a vehicle so as to form a paste, and a film of the paste is applied to a base plate and then baked to form a resistance film. This conventional film is based on the use of silver which is difficult to be oxidized even by baking together with palladium or ruthenium oxide as the raw material for the resistance member. However, this composition is high in price due to the use of expensive silver. Additionally, though palladium forms its oxide which alloys with silver on baking and thereby presents a resistance value, the resultant oxide of palladium, in the course of baking, partly becomes converted to active palladium metal and the active palladium forms an alloy with silver. The baking reaction is complicated and the resistance value is unstable and therefore the baking conditions must be strictly controlled for obtaining a product having a predetermined constant resistance value. Moreover, ruthenium oxide is high in price and is poisonous.

This invention is directed to the feature that zinc, which is subject to oxidation in the air and therefore is considered not suitable as a raw material for a baked resistance film, is used to form a baked film of definite resistance value and to obtain a novel baked resistance member which is more economical than the conventional one wherein silver is chiefly used.

One example of this invention process applied to the manufacture of a thick film integrated circuit will be explained in detail as follows:

Zinc metal powder is mixed with glass powder having a softening point of 500°C. - 750°C. and optionally also with metal powders of copper, tin, lead or the like so as to provide a mixed powder. To the mixed powder is added a conventional synthetic resin paint for silk screen printing, preferably, the so-called squeegee oil which is commercially available. The components are blended together to form a paste. This paste is applied, by painting or printing, on a heat-resistant base plate of ceramic or the like, for example, a ceramic base plate of predetermined size so as to form integrally therewith a resistance film. For forming a conductor portion of an integrated circuit film a paste comprising silver powder mixed with a synthetic resin paint is separately prepared and is applied to the base plate. Thus a predetermined integrated circuit film is formed by these films. For forming a film on the base plate, in general, a conventional silk screen printing machine is preferably used. These films are next heated at a temperature of 100°C. - 150°C. or allowed to stand at room temperature for a long time, so as to evaporate the vehicle contained therein, whereby the films are dried and solidified. Then, the base plate is introduced into a furnace, such as an electric furnace or the like, and its temperature is raised to about 650°C. in 2-7 minutes and the plate is then kept at a temperature 650°C. - 750°C. for 10-15 minutes, and then removed. As a result thereof, there is obtained a hard baked film firmly fixed to the base plate and having a definite resistance value, with the metallic zinc being non-oxidized.

The reason why the zinc is not oxidized and the major portion thereof remains in the metallic state during the baking operation probably takes place because the foregoing resin is burned and generates a combustion gas near but below the melting point of the metal zinc (419.5°C.) and continues burning up to a temperature above the melting point. Accordingly the combustion gas remains on the base plate to cover the same and protect the zinc metal from the oxygen within the furnace and under this intercepting condition the zinc metal melts as a film. In fact, a metal, whose melting point is outside the foregoing combustion range, e.g. tin (melting point 231.9°C.) lead (melting point 327.4°C.), copper (melting point 1,083°C.) become converted to the oxide to be of high resistance or insulating.

With a paste film containing glass powder, during the baking operation, the glass softens or fuses and not only serves as an adhesive agent for adhering the baked powder to the base plate but also covers the surface of the zinc powder to prevent the oxidization thereof and additionally is interposed between the metal particles to insulate them from each other for serving to control and increase the resistance value. As the glass powder, an alkali-free glass having a softening point of 500° – 700°C. is preferable and glass frit such as of lead borosilicate or barium borosilicate is suitable. As for the baking condition, it has been found that 650°C. – 750°C. for 10–15 minutes is preferred. This will be demonstrated hereinafter in the following table.

| COMPOSITION | TEMPERATURE | | | |
|---|---|---|---|---|
| | 750°C. | 700°C. | 650°C. | 550–580°C. |
| 1) Zn 0.85 Cu 0.05 Pb glass 0.1 | 5 KΩ | | 80Ω | ∞ |
| 2) Zn 0.9 Pb glass 0.1 | 180 Ω | 1Ω | 16Ω | ∞ |
| 3) Zn 0.95 Pb glass 0.05 | 200 Ω | | 30Ω | ∞ |
| Produced zinc oxide | below about 10% | about 1–2% | about 1–2% | about 1–2% |

When the temperature is below 650°C., the baked film is flossy and is infinite in its resistance value. Within the range of 650°–750°C. it has a definite resistance value. Especially, at 700°–750°C., a hard film firmly fixed to the surface of the base plate can be obtained. Generally, the hardness of the film, and the resistance value thereof can be properly adjusted by the addition of suitable amounts of glass powder. The degree of oxidation of the zinc metal is below about 10 percent under the foregoing baking condition.

Copper, tin, lead or the like, form oxides thereof upon baking and serve to adjust the resistance value.

According to this invention, a baked film consisting of metal zinc powder alone is also possible. In this case, in almost the same manner as above, the powder is blended with the synthetic resin paint to form a paste and the paste is applied by printing to a base plate to form a film of the paste, and then the film is baked, whereby a resistance member of a selected resistance value can be obtained. Generally, zinc metal powder mixed with glass powder provides a better product as compared with one not containing glass powder.

DESCRIPTION OF THE PREFERRED EMBODIMENTS

Example 1

Zinc metal powder is combined with borosilicate glass powder in the ratio as indicated in Table 1. A squeegee oil for silk screen printing, which comprises 40 percent polymethacrylic ester in trimethyl benzene, of one-half volume, is added thereto and is blended to form a paste. This paste is applied onto a ceramic base plate to form a film of about 0.2 – 0.3 mm in thickness and then the base is baked in an electric furnace at 700°–750°C. for 10 minutes. The area resistance values of the resultant resistance members are shown in Table 1.

Table 1

Zinc-Glass System Resistance Members
Composition (% by weight)

| Zinc | Glass | Area Resistance Value Ω/sq. area |
|---|---|---|
| 10 | 90 | ∞ |
| 20 | 80 | 5 MΩ |
| 30 | 70 | 3 MΩ |

Table 1-Continued

Zinc-Glass System Resistance Members
Composition (% by weight)

| Zinc | Glass | Area Resistance Value Ω/sq. area |
|---|---|---|
| 40 | 60 | 150 KΩ |
| 50 | 50 | 2 KΩ |
| 60 | 40 | 90 Ω |
| 70 | 30 | 15 Ω |
| 80 | 20 | 8 Ω |
| 90 | 10 | 6 Ω |
| 100 | 0 | 8Ω |

Example 2

Zinc metal powder, copper powder and glass powder are mixed together in the ratio shown in Table 2, and the mixture is formed into a paste by using one-half volume of 30 percent polymethacryl ethyl ester in benzyl alcohol. This paste is applied onto a ceramic base plate to form a film of about 0.2 – 0.3 mm in thickness and the plate with the film is baked in an electric furnace at 700°–750°C. for 10 minutes. The area resistance value of the products are shown in Table 2.

Table 2

Zinc-Copper-Glass System Resistance Members
Composition (% by weight)

| Zinc | Copper | Glass | Area Resistance Value Ω/sq. area |
|---|---|---|---|
| 10 | 80 | 10 | ∞ |
| 20 | 70 | 10 | 5 MΩ |
| 30 | 60 | 10 | 2 MΩ |
| 40 | 50 | 10 | 100 KΩ |
| 50 | 40 | 10 | 1500 Ω |
| 60 | 30 | 10 | 700 Ω |
| 70 | 20 | 10 | 100 Ω |
| 80 | 10 | 10 | 25 Ω |

Example 3

Zinc metal powder, copper powder and glass powder are mixed in the ratio shown in Table 3 and the baking is effected in substantially the same manner as in Example 2. The resultant products have the following area resistance values.

Table 3

Composition (% by weight)

| Zinc | Copper | Glass | Area Resistance Value Ω/sq. area |
|---|---|---|---|
| 10 | 10 | 80 | ∞ |
| 20 | 10 | 70 | 5 MΩ |
| 30 | 10 | 60 | 7 MΩ |

As apparent from these Examples, if the amount of zinc powder is above 20 percent, the baked film has a definite resistance value and can be used as a resistance member.

Thus, according to the invention, zinc metal powder is formed into a paste by mixing the same with a synthetic resin paint having a combustion temperature overlapping the melting point of zinc powder, and a film of the paste is baked so that the zinc powder is sintered or fused with substantially no oxidation, and is formed into a resistance member. As a complicated baking reaction is not employed, as in the conventional case where palladium is used, the baking control is simple and a constant, reproducible resistance value of the product can be easily obtained. Additionaly, the product is very economical as compared with the conventional one where a noble metal such as silver or the like is used. Further, an excellent resistance member can be obtained with zinc in an amount of more than 20 percent contained therein.

What is claimed is:

1. A process of manufacturing a resistance member comprising combining zinc metal powder or a mixture of zinc metal powder and an inorganic powder, with a synthetic resin paint to form a paste, the synthetic resin paint being constituted so as to begin burning and generating combustion gas at a temperature near but below the melting point of zinc and to continue burning up to a temperature near but above the melting point of zinc and within the range of these temperatures to produce a large amount of combustion gas before and after the melting of the zinc metal, applying the paste on a substrate to form a film thereon, and the heating the film to form a baked zinc film, the combustion gas generated by the burning of the synthetic resin paste remaining on the substrate to cover the same and protect the zinc metal, while the zinc metal melts to form the baked film such that oxidation of the zinc metal is intercepted and the baked zinc film formed on the substrate contains less than about 10 percent of oxidized zinc.

2. A process according to claim 1, wherein said inorganic powder comprises glass powder.

3. A process according to claim 1, wherein the inorganic powder comprises glass powder and metal powder of copper, tin or lead.

4. A process according to claim 1, wherein said synthetic resin paint comprises a squeegee oil used for silk screen printing.

5. A process according to claim 1, wherein said synthetic resin paint comprises a cellulose resin, a vinyl resin or mixture thereof and a vehicle.

6. A process according to claim 1, wherein said synthetic resin paint comprises 30 percent polymethacrylic ester in benzyl alcohol.

7. A process according to claim 1, wherein said synthetic resin paint comprises 40 percent polymethacrylic ester in trimethyl benzene.

8. A process according to claim 1, wherein the heating of the film is at a temperature of 650° – 750°C. for 10–15 minutes.

9. A process according to claim 1, wherein said paste is prepared by blending zinc metal powder alone with the synthetic resin paint.

10. A process according to claim 1, wherein said paste is prepared by mixing zinc metal powder of at least 20 parts by weight with the inorganic powder as the remainder, and the resultant mixture is blended with one-half volume of the synthetic resin paint.

11. A process according to claim 6, wherein the mixture comprises zinc metal powder of at least 20 parts by weight and glass powder as the remainder.

12. A process according to claim 6, wherein the mixture comprises zinc metal powder of at least 20 parts by weight, glass powder of 10 parts by weight and metal powder as the remainder.

13. A resistance member consisting essentially of a a baked resistance film on a base, said film having determinate resistance values and consisting of inorganic materials including at least 20 percent zinc by weight.

14. A baked resistance member according to claim 13 wherein the zinc in the film contains less than 10 percent of oxidized zinc by weight.

* * * * *